United States Patent
Peisa et al.

(10) Patent No.: US 11,778,658 B2
(45) Date of Patent: Oct. 3, 2023

(54) BEAM CONFIGURATION INDICATING ALLOWED BEAMS DURING A STATE TRANSITION OR INITIAL ACCESS

(71) Applicant: Telefonaktiebolaget LM Ericsson (publ), Stockholm (SE)

(72) Inventors: Janne Peisa, Espoo (FI); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 16/324,822

(22) PCT Filed: Aug. 15, 2018

(86) PCT No.: PCT/SE2018/050828
§ 371 (c)(1),
(2) Date: Feb. 11, 2019

(87) PCT Pub. No.: WO2019/039986
PCT Pub. Date: Feb. 28, 2019

(65) Prior Publication Data
US 2020/0084798 A1      Mar. 12, 2020

Related U.S. Application Data

(60) Provisional application No. 62/549,441, filed on Aug. 24, 2017.

(51) Int. Cl.
*H04W 74/00*      (2009.01)
*H04B 7/08*      (2006.01)
(Continued)

(52) U.S. Cl.
CPC .......... *H04W 74/006* (2013.01); *H04B 7/088* (2013.01); *H04W 48/12* (2013.01);
(Continued)

(58) Field of Classification Search
CPC ............. H04W 72/085; H04W 72/046; H04W 74/0833; H04W 74/008; H04W 74/006;
(Continued)

(56) References Cited

U.S. PATENT DOCUMENTS 9,585,083 B2    2/2017  Li et al.
9,681,335 B2    6/2017  Josiam et al.
(Continued)

FOREIGN PATENT DOCUMENTS

CN    101558678 A    10/2009
CN    106998580 A    8/2017
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 1-644.
(Continued)

*Primary Examiner* — Jianye Wu
(74) *Attorney, Agent, or Firm* — Murphy, Bilak & Homiller, PLLC

(57) ABSTRACT

Embodiments herein relate to a wireless device (10) for handling communication of the wireless device (10) in a wireless communication network (1), wherein a radio network node (12) in the wireless communication network (1) provides radio coverage over a cell. The wireless device receives from the radio network node (12), when the wireless device (10) is in a first state, a beam configuration indicating which beam or beams of the cell the wireless device (10) is allowed to select during a state transition or initial access. Furthermore, the wireless device performs an initial access to the cell or a state transition taking the beam configuration into account.

16 Claims, 13 Drawing Sheets

(51) Int. Cl.
  *H04W 48/12* (2009.01)
  *H04W 48/16* (2009.01)
  *H04W 72/044* (2023.01)
  *H04W 72/542* (2023.01)
  *H04W 28/086* (2023.01)
  *H04W 74/08* (2009.01)

(52) U.S. Cl.
  CPC ......... *H04W 48/16* (2013.01); *H04W 72/046* (2013.01); *H04W 72/542* (2023.01); *H04W 74/008* (2013.01); *H04W 74/0833* (2013.01); *H04W 28/086* (2023.05)

(58) Field of Classification Search
  CPC ..... H04W 28/08; H04W 48/12; H04W 48/16; H04B 7/088
  See application file for complete search history.

(56) References Cited

U.S. PATENT DOCUMENTS

| | | | |
|---|---|---|---|
| 2012/0100823 A1* | 4/2012 | Chen | H04W 4/08 455/404.1 |
| 2017/0063503 A1 | 3/2017 | Liu et al. | |
| 2017/0142637 A1* | 5/2017 | Brock | H04W 36/32 |
| 2018/0192347 A1* | 7/2018 | Shaheen | H04W 36/0077 |
| 2018/0220344 A1* | 8/2018 | Shaheen | H04W 4/60 |
| 2018/0324661 A1* | 11/2018 | Ryden | H04B 7/0695 |
| 2019/0053244 A1* | 2/2019 | Mildh | H04W 48/16 |
| 2019/0132778 A1* | 5/2019 | Park | H04B 7/0695 |
| 2019/0253127 A1* | 8/2019 | Kang | H04B 7/088 |
| 2020/0305041 A1* | 9/2020 | Fan | H04W 36/06 |

FOREIGN PATENT DOCUMENTS

| | | | | |
|---|---|---|---|---|
| CN | 109792610 A | * | 5/2019 | ........... H04B 7/0408 |
| TW | 201742488 A | * | 12/2017 | ........... H04B 17/309 |

OTHER PUBLICATIONS

Unknown, Author, "Derivation of cell quality in Idle/Inactive", 3GPP TSG-RAN WG2 Meeting #98, R2-1704896, Hangzhou, China, May 15-19, 2017, 1-2.

Unknown, Author, "Discussion on additional RS for beam management", TSG-RAN WG1 Meeting #89, R1-1707478, Hangzhou, China, May 15-19, 2017, 1-4.

Unknown, Author, "Email discussion report on [98#30][NR] RRC Connection Control", 3GPP TSG RAN WG2 Meeting #99, R2.1708799, Berlin, Germany, Aug. 21-25, 2017, 1-58.

Unknown, Author, "Further details of handover execution in NR", 3GPP TSG-RAN WG2#99, Tdoc R2-1707857, Berlin, Germany, Aug. 21-25, 2017, 1-5.

3GPP, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.3.0, Jun. 2017, pp. 1-107.

Unknown, Author, "Access Control in NR", 3GPP TSG-RAN WG2 Meeting #96, R2-168256, Reno, Nevada, USA, Nov. 14-18, 2016, 1-5.

Unknown, Author, "Higher Layer Implications of Beamforming During Random Access", 3GPP TSG-RAN WG2 Ad Hoc on NR, Ericsson, Tdoc R2-1707279, Qingdao, P.R. of China, Jun. 27-29, 2017, 1-5.

Unknown, Author, "Higher layer implications of beamforming during random access", 3GPP TSG-RAN WG2 #97 Tdoc R-1700881, Athens, Greece, Feb. 13-17, 2017, 1-5.

Unknown, Author, "Status Report to TSG", 3GPP TSG RAN meeting #76 RP-171137, West Palm Beach, USA, Jun. 5-8, 2017, 1-218.

Unknown, Author, "Support beam operation for NR mobility", 3GPP TSG RAN WG2 AH_NR Meeting R2-1700254, Spokane, USA, Jan. 17-19, 2017, 1-5.

* cited by examiner

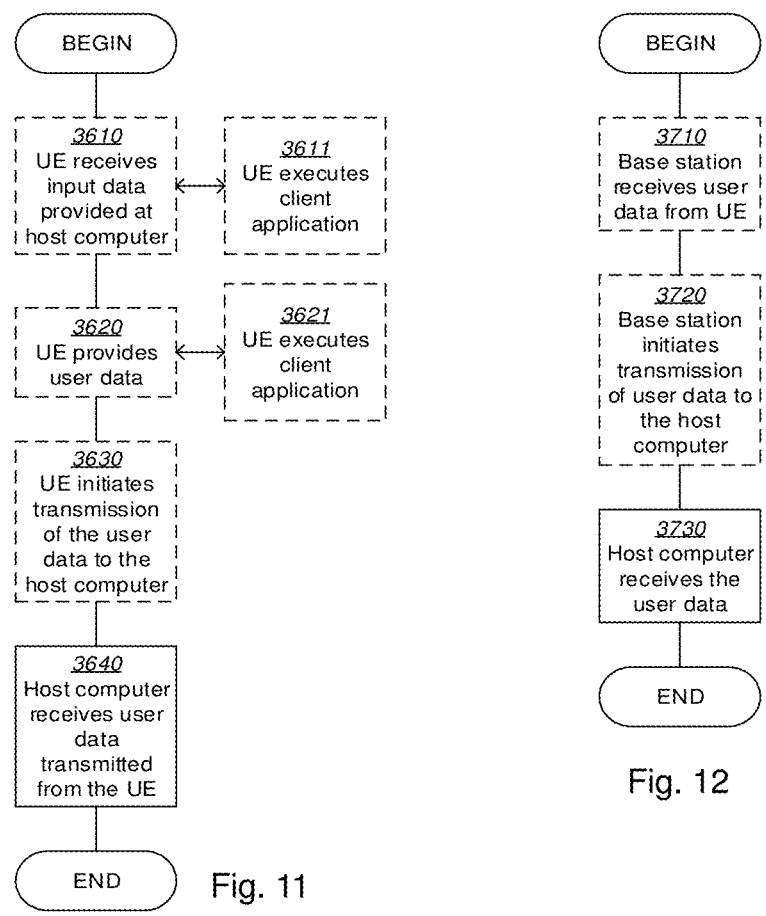

BEAM CONFIGURATION INDICATING ALLOWED BEAMS DURING A STATE TRANSITION OR INITIAL ACCESS

TECHNICAL FIELD

Embodiments herein relate to a wireless device, a radio network node and methods performed therein regarding wireless communication. Furthermore, a computer program product and a computer-readable storage medium are also provided herein. In particular, embodiments herein relate to handling communication between the wireless device and a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas also known as cells or cell areas, with each cell being served by radio network node such as an access node e.g. a Wi-Fi access point or a radio base station (RBS), which in some networks may also be called, for example, a NodeB, eNodeB, or a gNodeB. The cell is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. Channel-state information (CSI) comprises Channel Quality Indicator (CQI), Precoding Matrix Indicator (PMI), and Rank Indicator (RI). The CQI is reported by wireless device to the radio network node. The wireless device indicates modulation scheme and coding scheme to the radio network node. To predict the downlink channel condition, CQI feedback by the wireless device may be used as an input. CQI reporting can be based on PMI and RI. PMI is indicated by the wireless device to the radio network node, and which precoding matrix may be used for downlink transmission is determined by RI. The wireless device further indicates the RI to the radio network node, i.e. the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS, i.e. measures on CSI-RS as indicated by the measurement grant. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a New Radio (NR) network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

In LTE, there are certain protection mechanisms to avoid or remedy a situation where the wireless device is accessing the system in a heavily loaded cell.

First, the network may bar certain cells or frequencies using cellBarred and intraFreqReselection information elements in system information broadcast. Such cells or frequencies shall not be used by any wireless devices.

Second, the network may apply an access class barring to limit the number of wireless devices accessing the cell. The access class barring enables the network to differentiate between different access classes by setting a percentage of allowed call attempts, e.g. it may allow emergency calls to be always allowed, but only allow 50% of calls made for other purposes. Access class barring allows a finer granularity of access control than cell barring. That is described in TS 36.331 v14.0.0 as follows:

1> if timer T302 or "Tbarring" is running:
2> consider access to the cell as barred;
1> else if SystemInformationBlockType2 includes "AC barring parameter":
[..]
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1,
2> start timer "Tbarring" with the timer value calculated as follows, using the ac-BarringTime included in "AC barring parameter":
"Tbarring"=(0.7+0.6*rand)*ac-BarringTime;

Finally, the network may reject the connection setup or connection resume attempt with Radio Resource Control (RRC) Connection Reject, which allows the network to control the access for individual wireless devices, but does not prevent a potential overload of the random access resources. That is described in 36.331 v14.0.0 as follows:
Reception of the RRCConnectionReject by the UE
The UE shall:
1> stop timer T300;
1> reset MAC and release the MAC configuration;
1> except for NB-IoT, start timer T302, with the timer value set to the waitTime;
[..]
1> if deprioritisationReq is included and the UE supports RRC Connection Reject with deprioritisation:
2> start or restart timer T325 with the timer value set to the deprioritisationTimer signalled;
2> store the deprioritisationReq until T325 expiry;
NOTE: The UE stores the deprioritisation request irrespective of any cell reselection absolute priority assignments (by dedicated or common signalling) and regardless of RRC connections in E-UTRAN or other RATs unless specified otherwise.
[..]
2> inform upper layers about the failure to establish the RRC connection and that access barring for mobile originating calls, mobile originating signalling, mobile terminating access and except for NB-IoT, for mobile originating CS fallback is applicable, upon which the procedure ends;

Later, an extended wait time has been introduced and can be used in the procedure.

In NR, there can be multiple beams associated to a cell. Hence, during initial access, like IDLE or INACTIVE to CONNECTED transitions, and handovers, one could say that the wireless device accesses a beam in the sense that:
the wireless device selects at least one beam associated to the cell;
by knowing a Random Access Channel (RACH) configuration, the wireless device sends at least one message, such as MSG1, associated to the selected beam; and
the wireless device monitors the Random access response (RAR) in the same DL beam.

As cells in NR can be comprised by multiple Transmission Reception points (TRP), the load in different beams, that could in principle be selected by the wireless device, can be quite different. Hence, the wireless device may access a beam with very high load e.g. in the UL, due to many RACH attempts, which can be harmful to the system. That can be even worse considering that in e.g. NR some wireless devices are allowed to send multiple RACH preambles, e.g., associated to multiple beams for reliability and thereby increasing the load. This may thus lead to a limited or reduced performance of the wireless communication network.

SUMMARY

An object of embodiments herein is to provide a mechanism that improves the performance of the wireless communication network when using beamforming in a wireless communication network.

According to an aspect the object is achieved by providing a method performed by a wireless device for handling communication of the wireless device in a wireless communication network. A radio network node in the wireless communication network provides radio coverage over a cell. The wireless device is in a first state, e.g. inactive state in the cell or enters the cell, and receives a beam configuration indicating which beam or beams of the cell the wireless device is allowed to select during a state transition or initial access. The wireless device then performs an initial access to the cell or a state transition taking the beam configuration into account.

According to another aspect the object is achieved by providing a method performed by a radio network node, also referred to as network node, for handling, e.g. setting up, communication of a wireless device in a wireless communication network. The radio network node provides radio coverage over a cell in the wireless communication network. The radio network node transmits to the wireless device, when the wireless device is in a first state, a beam configuration or indicating which beam or beams the wireless device is allowed to select during an initial access or state transition. The radio network node may further reject or accept the initial access by the wireless device. The beam configuration may be provided as configuration information e.g. in system information, during rejection of the initial access, as a response to a random access request or similar. The rejection may further comprise additional information on how to access the cell again e.g. using another beam and/or another RACH resource e.g. dedicated for that wireless device.

According to yet another aspect the object is achieved by providing a wireless device for handling communication of the wireless device in a wireless communication network. A radio network node in the wireless communication network is configured to provide radio coverage over a cell. The wireless device is configured to receive from the radio network node, when the wireless device is in a first state, a beam configuration indicating which beam or beams of the cell the wireless device is allowed to select during a state transition or initial access. The wireless device is further configured to perform an initial access to the cell or a state transition taking the beam configuration into account.

According to still another aspect the object is achieved by providing a radio network node for handling communication of a wireless device in a wireless communication network. The radio network node is configured to provide radio coverage over a cell in the wireless communication network. The radio network node is configured to transmit to the wireless device, when the wireless device is in a first state, a beam configuration indicating which beam or beams the wireless device is allowed to select during an initial access or a state transition.

According to still another aspect the object is achieved by providing a radio network node and wireless device comprising respective processing circuitry configured to perform the methods herein.

It is herein also provided a computer program product comprising instructions, which, when executed on at least one processor, causes the at least one processor to carry out the methods herein, as performed by the radio network node or the wireless device. Furthermore, it is herein provided a computer-readable storage medium, having stored thereon a computer program product comprising instructions which, when executed on at least one processor, cause the at least one processor to carry out the methods herein, as performed by the radio network node or the wireless device.

The embodiments herein enable or provide a system that is protected from overloading system resources associated with beams, especially random access resources, from wireless device's in a first state, such as idle or inactive state, trying to perform state transitions to e.g. connected state or initial access. This will increase the overall system robustness and capacity. The method enables the wireless device to select a beam which can meet both the requirement from the network (NW) and/or requirement from the wireless device. Then both NW and the wireless device can experience better performance. Hence, embodiments herein improve the performance of the wireless communication network.

BRIEF DESCRIPTION OF THE DRAWINGS

Embodiments will now be described in more detail in relation to the enclosed drawings, in which:

FIGS. 9-12 are flowcharts illustrating methods implemented in a communication system including a host computer, a base station and a user equipment.

DETAILED DESCRIPTION

Figure 1:
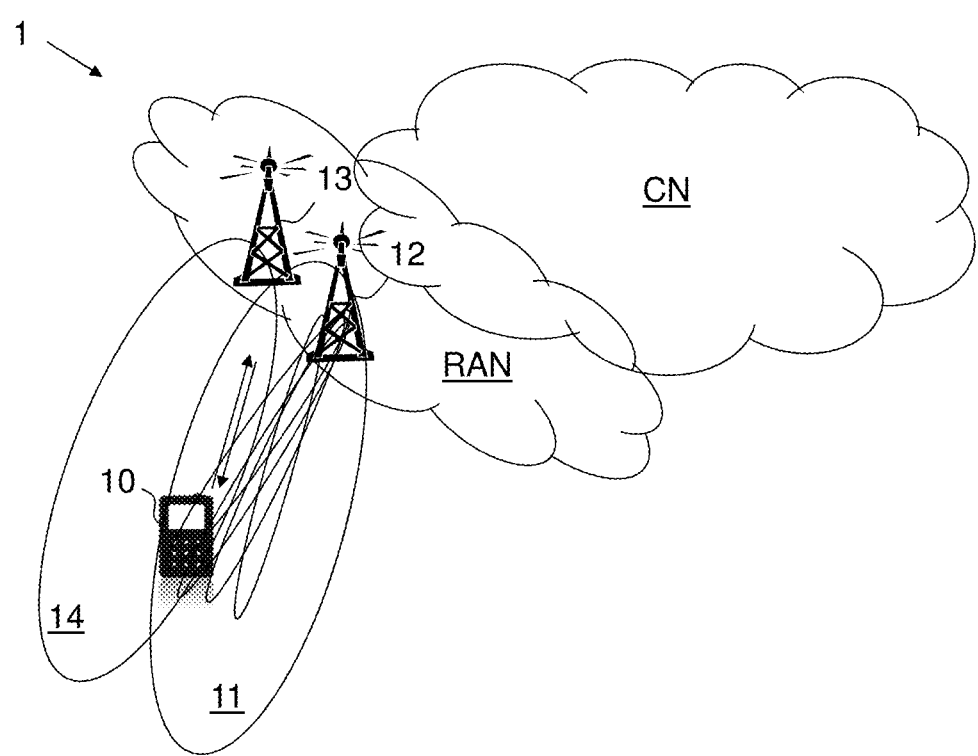
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment (UE) and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely a radio network node, serving or providing radio coverage over a geographical area, a first cell 11 or a first service area, of a first radio access technology (RAT), such as NR, LTE, Wi-Fi, WiMAX or similar. The radio network node 12 may be a transmission and reception point, a network node such as an Mobility Management Entity (MME), a serving Gateway, a Wireless Local-Area Network (WLAN) access point or an Access Point Station (AP STA), an access node, an access controller, a base station, e.g. a radio base station such as a NodeB, an evolved Node B (eNB, eNodeB), gNodeB, a base transceiver station, a radio remote unit, an Access Point Base Station, a base station router, a transmission arrangement of a radio base station, a stand-alone access point or any other network unit or node capable of communicating with a wireless device within the cell served by the radio network node 12 depending e.g. on the first radio access technology and terminology used. The radio network node 12 may be referred to as a serving network node wherein the first cell may be referred to as a source beam, and the serving network node serves and communicates with the wireless device 10 in form of DL transmissions to the wireless device 10 and UL transmissions from the wireless device 10.

A second radio network node 13 may further provide radio coverage over a second cell 14 or a second service area of a second radio access technology (RAT), such as NR, LTE, Wi-Fi, WiMAX or similar. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second cell 14 may be referred to as neighbouring or target cell comprising one or more neighbouring beams or target beams.

It should be noted that a service area may be denoted as a cell, a beam group, a mobility measurement beam, or similar to define an area of radio coverage. The radio network nodes transmit RSs over respective service area in beams. Hence, the first and second radio network nodes may transmit CSI-RSs or beam reference signals (BRS), repeatedly, in time, in a large number of different directions using as many Tx-beams as deemed necessary to cover the service area of the respective radio network node. Hence the radio network node 12 provides radio coverage over the first service area using a first reference signal, e.g. first CSI-RS, for the first service area 11 in the wireless communication network 1. The second radio network node 13 provides radio coverage over the second service area 14 using a number of beams each with a reference signal, e.g. one or more second CSI-RSs, in the wireless communication network.

A mechanism may be used during handover execution to avoid beams with heavy load by informing the wireless device 10 of a list of allowed or non-allowed beams that could be accessed in a target cell. Embodiments herein though address the problem in initial access or state transitions.

Embodiments herein provide a method to protect e.g. the RACH channel from being overloaded in multi-beam systems during initial access and/or state transitions between e.g. a sleeping state, such as RRC_IDLE or RRC_INACTIVE state, and an active state, such as RRC_CONNECTED state. According to embodiments herein the wireless device 10 may perform a random access procedure where:
  the wireless device 10 is configured by the radio network node 12 to prefer or to avoid the access of RACH resources associated to certain configured beams;
  the wireless device 10 selects or re-selects a beam that has been implicitly or explicitly indicated by the network to be accessible without causing potential overloading issues to the wireless communication network;
  the wireless device 10 access a cell of the beam by sending an initial access message, such as connection request e.g. RRC Connection Request, RRC Connection Resume Request, RRC Connection Reconfiguration Request or equivalent, associated to the selected beam and monitors for a random access response (RAR) of the selected beam.

According to embodiments herein the radio network node 12 informs the wireless device 10 about which beam or beams the radio network node 12 prefers the wireless device 10 will select during a state transition (or initial access. Thus, the radio network node 12 may affect or control which beam or beams the wireless device 10 selects and thereby avoiding overloading system resources associated with beams, especially random access resources, from e.g. wireless device's trying to perform state transitions to e.g. a connected mode.

Figure 2A:
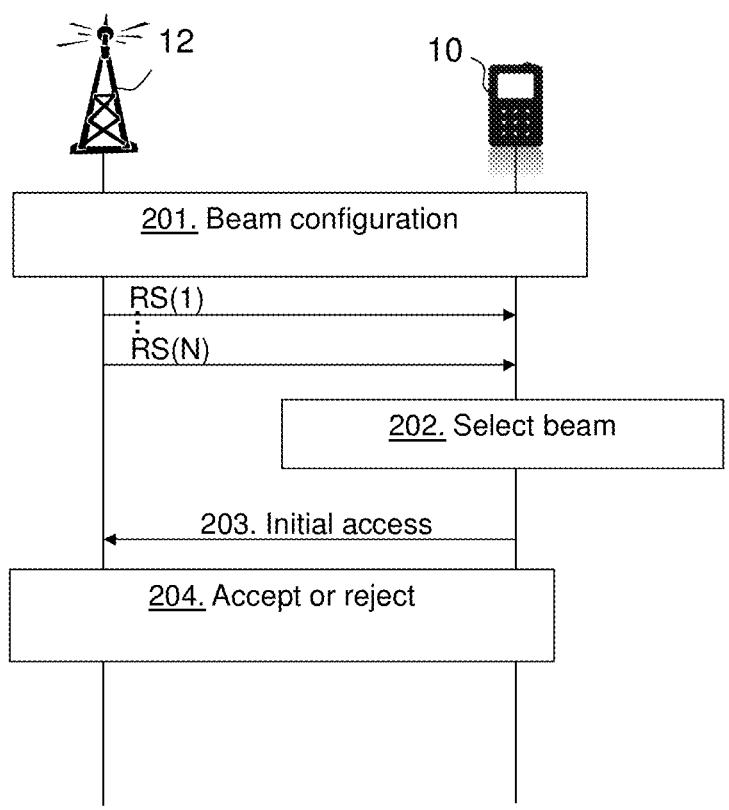
FIG. 2a is a schematic combined flowchart and signalling scheme according to embodiments herein.

FIG. 2 is a combined signalling scheme and flowchart according to embodiments herein. The wireless device 10 is in a first state, e.g. inactive state, in the cell or enters the cell.

Action 201. The radio network node 12 provides to the wireless device 10 a beam configuration controlling or indicating which beam or beams the wireless device selects during an initial access or state transition. The beam configuration may be provided as: configuration information e.g. in system information as shown; during rejection of the initial access; or as a response to a random access request.

Action 202. The wireless device 10 may, optionally, select beam taking the beam configuration into account.

Action 203. The wireless device 10 performs an initial access to the cell taking the beam configuration into account. For example, the selection of beam may be based on the beam configuration, or the initial access itself may be based on the beam configuration.

Action 204. The radio network node 12 may further reject or accept the initial access by the wireless device 10. The rejection may further comprise additional information on how to access the cell again e.g. using another beam and/or another RACH resource e.g. dedicated for that wireless device.

Figure 2B:
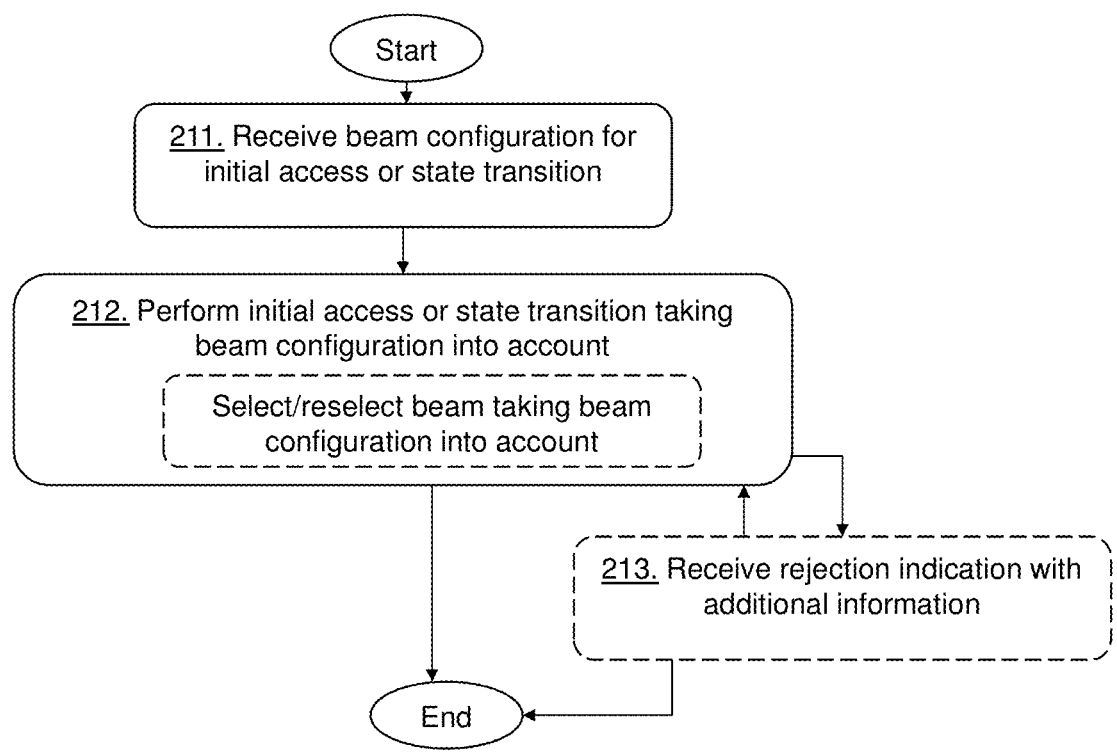
FIG. 2b is a flowchart depicting a method performed by a wireless device according to embodiments herein.

The method actions performed by the wireless device 10 for handling communication of the wireless device 10 in the wireless communication network 1 according to embodiments herein will now be described with reference to a flowchart depicted in FIG. 2b. The actions do not have to be taken in the order stated below, but may be taken in any suitable order. Actions performed in some embodiments are marked with dashed boxes. The radio network node 12 in the wireless communication network 1 provides radio coverage over the cell e.g. serves the wireless device in the cell. A cell may comprise one or more beams.

Action 211. The wireless device 10 receives from the radio network node 12, when the wireless device 10 is in the first state, e.g. idle state, the beam configuration indicating which beam or beams of the cell, e.g. the first cell or the second cell, the wireless device 10 is allowed to select during the state transition or the initial access. The beam configuration may comprise a threshold value of strength or quality, a list of not wanted beams, a list of preferred beams, a list of allowed beams, or a list of non-allowed beams and thereby may the beam configuration indicate which beam or beams of the cell the wireless device 10 is allowed to select during the state transition or the initial access. 10. The beam configuration may be provided: as configuration information in system information; during rejection of the initial access; or as a response to a random access request.

Action 212. The wireless device 10 performs an initial access to the cell or a state transition taking the beam configuration into account. The wireless device 10 may perform the initial access to the cell or the state transition by selecting or reselecting a beam based on the received beam configuration.

Action 213. The wireless device 10 may receive, from the radio network node 12, a rejection indication rejecting the initial access with additional information on how to access the cell again. The wireless device may then perform action 212 taking the rejection indication into account.

Figure 2C:
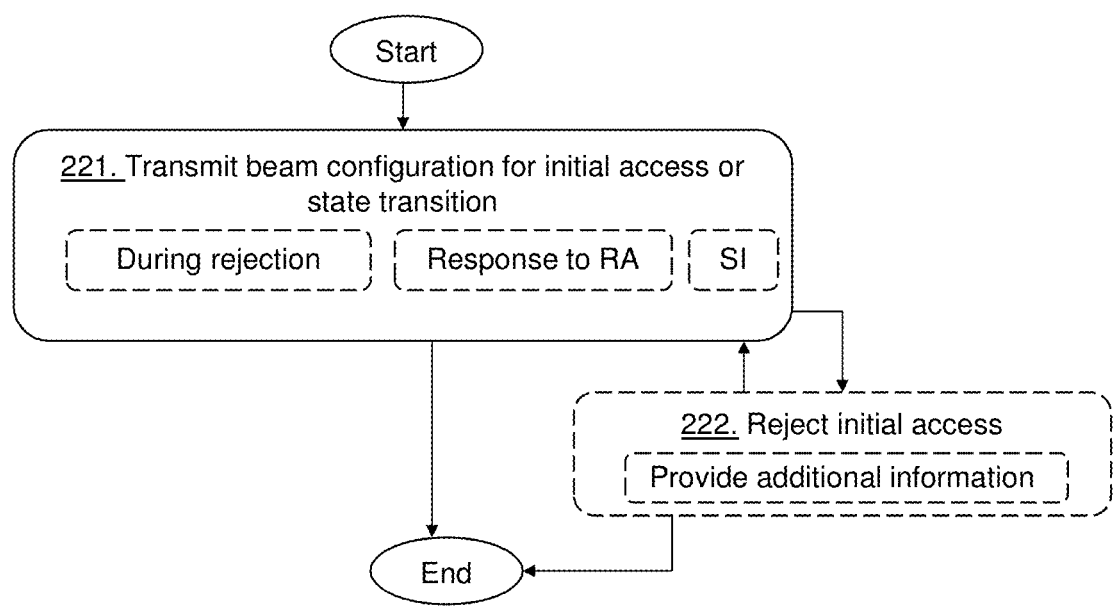
FIG. 2c is a flowchart depicting a method performed by a radio network node according to embodiments herein.

The method actions performed by the radio network node 12 for handling communication of the wireless device 10 in the wireless communication network 1 according to embodiments herein will now be described with reference to a flowchart depicted in FIG. 2c. The actions do not have to be taken in the order stated below, but may be taken in any suitable order. Actions performed in some embodiments are marked with dashed boxes. The radio network node 12 in the wireless communication network 1 provides radio coverage over the cell or serves the wireless device in the cell. The cell may comprise one or more beams.

Action 221. The radio network node 12 transmits to the wireless device 10, when the wireless device 10 is in the first state, the beam configuration indicating which beam or beams the wireless device is allowed to select during an initial access or a state transition. The beam configuration may comprise a threshold value of strength or quality, a list of not wanted beams, a list of preferred beams, a list of allowed beams, or a list of non-allowed beams and thereby may the beam configuration indicate which beam or beams of the cell the wireless device is allowed to select during the state transition or the initial access. The beam configuration may be provided: as configuration information in system information; during rejection of the initial access; or as a response to a random access request. It should be noted that the radio network node 12 may determine the bema configuration based on load of the different beams.

Action 222. The radio network node 12 may reject the initial access by the wireless device based on a condition. E.g. the radio network node may determine that the wireless device is using a beam that is highly loaded, or may reject the initial access for balancing the load to a different beam. The radio network node 12 may reject the initial access by providing the wireless device with additional information on how to access the cell again.

In the disclosure the terms "beams" are used. These beams can be identified by the wireless device 10 by the detection of reference signals that may implicitly or explicitly indicate a beam identifier. In e.g. NR, these beams can transmit an NR Synchronization Signal Block (SSB) burst set where each SSB in the set comprises an NR Primary Synchronization Signal (NR-PSS)/NR Secondary Synchronization Signal (NR-SSS)/NR Physical Broadcast Channel (NR-PBCH), where each SSB encodes the same cell Identity (ID) for the same cell. Each SSB also encodes a "time index" which works as a beam identification mechanism. The SSB set is the primary signal/channel to be monitored by IDLE/INACTIVE wireless devices to perform cell selection, cell reselection and initial access, where the wireless device 10 shall select at least one beam to access a cell and initiate random access. In NR, another type of reference signal can also be beamformed: CSI-RS. These can be configured for beam management and mobility procedures, both in RRC_CONNECTED wireless devices. For state transitions, the wireless device could be configured with specific CSI-RS resources to be monitored and to be associated to RACH resources to speed up the transition to a narrow beam directly.

Figure 3:
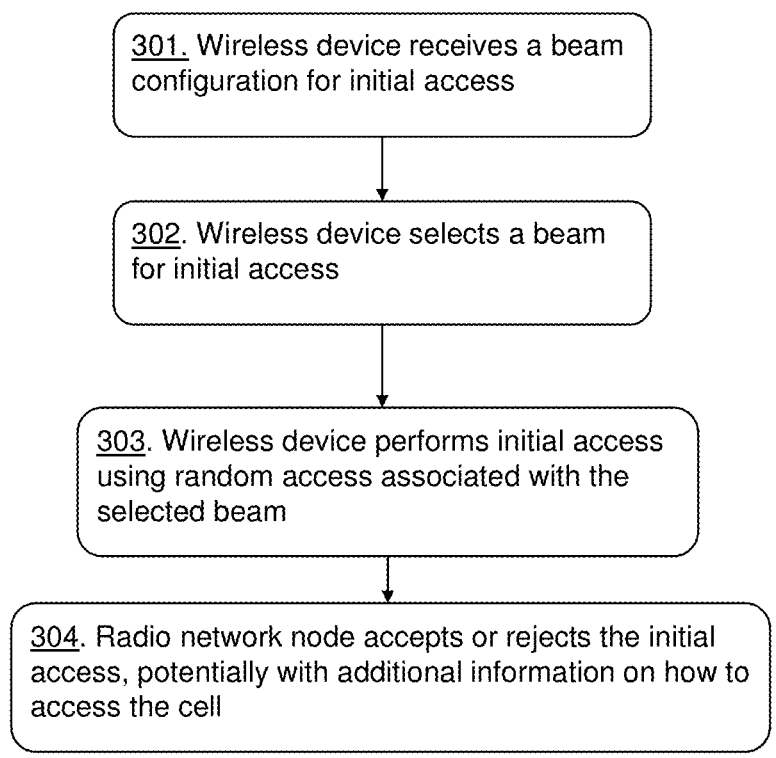
FIG. 3 is a schematic flowchart according to some embodiments herein.

The mechanism for the network to configure the wireless device 10 in inactive (sleeping) state, e.g. RRC_IDLE or RRC_INACTIVE, to avoid initial access in a congested beam is shown in FIG. 3.

Action 301. The radio network node 12 provides the wireless device 10 with the beam configuration for initial access. The beam configuration of allowed, non-allowed, and/or prioritized beams in action 301 may be included in the system information that may be read by a camping wireless device such as the wireless device 10. There are several variations on what information may be provided to the wireless device 10. The radio network node 12 may configure the wireless device 10 with one or several alternatives information listed below.

In one embodiment, the radio network node 12 indicates allowed beams associated to one or multiple cells to inform the wireless device 10 that the wireless device 10 shall only perform random access (RA) using a RACH associated to the indicated beams for the indicated cell or cells.

In addition or alternatively, the radio network node 12 indicates non-allowed beams associated to that one or multiple cells to inform the wireless device 10 that the wireless device 10 shall not perform RA using a RACH associated to the indicated beams for the indicated cell or cells. The information indicates that the wireless device 10 may otherwise access any other beam in any of the indicated cells.

In addition or alternatively, the radio network node 12 may indicate prioritized beams associated to that one or multiple cells to inform the wireless device 10 to prioritize RA associated to the indicated beams, which can be listed in order of priority or with some priority information included, for the indicated cell or cells.

In addition or alternatively, the radio network node 12 may indicate redirected beams associated to that one or multiple cells to inform the wireless device 10 that the wireless device 10 shall only perform RA using a RACH associated to the indicated beams for the indicated cell or cells. These are similar to allowed beam to certain extent, although they may be sent in another message and in different scenarios. The indication of redirected beams may also be an explicitly redirection of RACH resources where radio network node 12 can inform the wireless device 10 to use specific time, frequency, and/or preamble resource in the sub-sequent RACH attempt.

In addition or alternatively, the radio network node 12 may include, in addition to any of the information described above, a validity information such as specific RACH resources, e.g. a subset of configured ones, where the access associated to these beams shall not be accessed specific RACH resources that shall be accessed.

Action 302. The wireless device 10 may select a beam based on the received beam configuration.

Action 303. The wireless device 10 performs an initial access using random access resources associated with the selected beam.

Upon being configured by the radio network node 12 with an indication of e.g. allowed beams associated to that one or multiple cells, the wireless device 10 trying to access a cell that it is camping on, checks whether the currently selected beam is part of the list of allowed beams and/or is indicated as an allowed beam. If the selected beam is allowed, the wireless device 10 may access that beam if the wireless device 10 wants to perform a state transition. If the selected beam is not part of that list, the wireless device 10 may perform intra-cell beam reselection, which can be done based on different criteria such as i) select the beams with strongest measurement results, e.g. Reference Signal Received Power (RSRP), Reference Signal Received Quality (RSRQ), Signal to Interference plus Noise Ratio (SINR), or equivalent, or according to any combining rules, e.g. strongest RSRP AND strongest RSRQ, etc., within the list of allowed beams. If none of the allowed beams in the cell is suitable or have not been detected, the wireless device 10 may trigger cell re-selection or inter-cell beam reselection.

Upon being configured by the radio network node 12 with an indication of non-allowed beams associated to that one or multiple cells, the wireless device 10 trying to access a cell that it is camping on, may check whether the currently selected beam is part of the list of non-allowed beam and/or is indicated as an allowed beam. If it is not, the wireless device 10 can access that beam if it wants to perform a state transition (i.e. continue random access procedure associated to the selected beam). If the selected beam is part of that list, the wireless device 10 may perform intra-cell beam reselection, which can be done based on different criteria such as i) select the beams with strongest measurement results, e.g. RSRP, RSRQ, SINR, or equivalent, or according to any combining rules, e.g. strongest RSRP AND strongest RSRQ, etc., within any other beam not in the list of non-allowed beams. If any selected beam not in the list is not suitable or have not been detected, the wireless device 10 may trigger cell re-selection or inter-cell beam reselection.

Upon being configured by the radio network node 12 with an indication of prioritized beams associated to that one or multiple cells, the wireless device trying to access a cell that it is camping on, may check its list of the detected and/or suitable beams (i.e. accessible from a radio condition perspective) and compare with the list of prioritized beams. The wireless device 10 then selects the one with highest priority among the detected/suitable ones. Additional conditions may be fulfilled e.g. certain difference in radio conditions has precedent to the prioritization recommended by the network.

Upon being configured by the radio network node 12 with an indication of redirected beams associated to that one or multiple cells, the wireless device 10 trying to access a cell that it is camping on, may check its list of the detected and/or suitable beams (i.e. accessible from a radio condition perspective) and compare with the list of redirected beams. The wireless device 10 then accesses any of the beams, that is being redirected, e.g., the one with strongest measurement results and/or combination of these.

Action 304. The radio network node 12 accepts or rejects the initial access, potentially with additional information back to the wireless device 10 on how to access the cell again.

Figure 4:
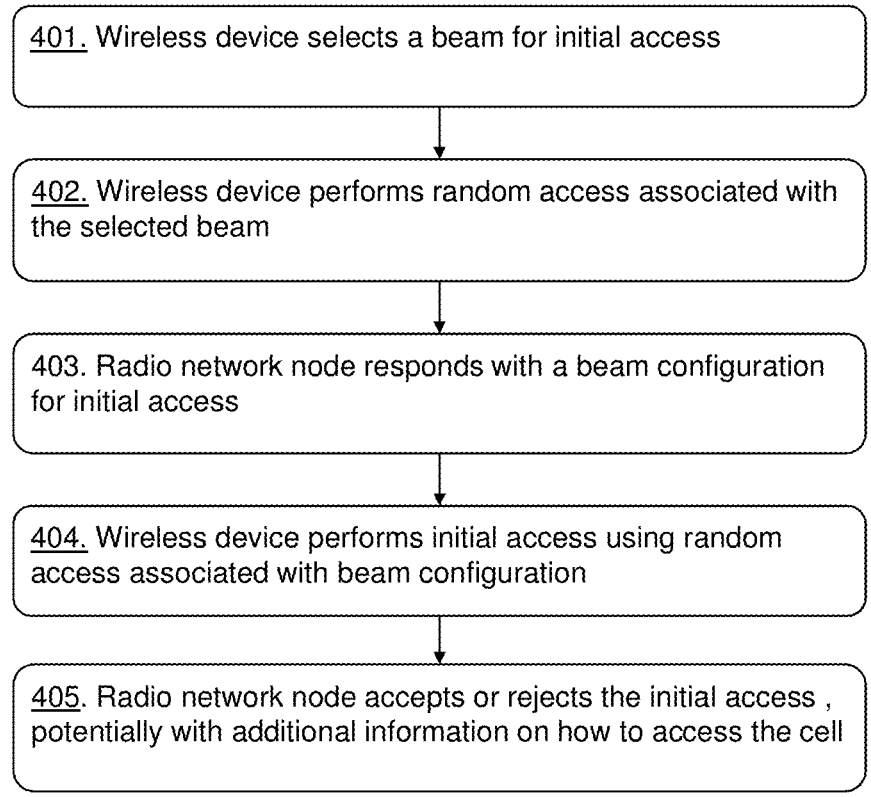
FIG. 4 is a schematic flowchart according to some embodiments herein.

The beam configuration information may be provided in a random-access response (RAR). This mechanism is shown in FIG. 4, and may be combined with one or several alternatives on the information provided to the wireless device 10.

Action 401. The wireless device 10 selects a beam for initial access.

Action 402. The wireless device 10 performs a random access, i.e. transmits a random access request, associated with the selected beam.

Action 403. The radio network node 12 responds to the random access request with a random access response and provides the wireless device 10 with a beam configuration for initial access.

For example, the radio network node 12 may confirm the beam selection. An absence of indication may also serve as an acknowledgement of selected beam. In addition, the radio network node 12 may indicate allowed beams associated to that cell or multiple cells to inform the wireless device 10 that the wireless device 10 shall only perform RA associated to the indicated beams for the indicated cell or cells.

In addition or alternatively, the radio network node 12 may indicate that the wireless device 10 should not perform initial access using the selected beam, and that the wireless device 10 should re-select any other beam. The radio network node 12 may also provide a list of non-allowed beams associated to that one or multiple cells to inform the wireless device 10 that the wireless device 10 shall not perform RA associated to the indicated beams for the indicated cell or cells.

In addition or alternatively, the radio network node 12 indicates prioritized beams associated to that cell or multiple cells to inform the wireless device 10 that the wireless device 10 should prioritize RA associated to the indicated beams, which may be listed in order of priority or with some priority information included, for the indicated cell or cells.

In addition or alternatively, the random access response from the radio network node 12 may contain an indication that the accessed beam was not allowed and a list of beams indicating to the wireless device 10 that these are allowed and should or could be accessed. The indication of redirected beam may also be an explicitly redirection of RACH resources where the radio network node 12 can inform the wireless device 10 to use specific time, frequency, and/or preamble resources in the sub-sequent RACH attempt.

Action 404. The wireless device 10 performs an initial access by performing random access associated with the beam configuration.

Upon being configured by the radio network node 12 with an indication of allowed beams associated to that cell or multiple cells, the wireless device 10 trying to access a cell that it is camping on, checks whether the currently selected beam is part of the list of allowed beam and/or is indicated as an allowed beam. If it is, the wireless device 10 can access that beam if it wants to perform a state transition. If the selected beam is not part of that list, the wireless device 10 should perform intra-cell beam reselection, which can be done based on different criteria such as i) select the beams with strongest measurement results (e.g. RSRP, RSRQ, SINR, or equivalent) or according to any combining rules (e.g. strongest RSRP AND strongest RSRQ, etc.) within the list of allowed beams. If none of the allowed beams in the cell is suitable or have not been detected, the wireless device 10 should trigger cell re-selection or inter-cell beam reselection.

Upon being configured by the radio network node 12 with an indication of non-allowed beams associated to that one or multiple cells, the wireless device 10 trying to access a cell that it is camping on, checks whether the currently selected beam is part of the list of non-allowed beam and/or is indicated as a non-allowed beam. If it is not, the wireless device 10 can access that beam if it wants to perform a state transition, i.e. continue random access procedure associated to the selected beam. If the selected beam is part of that list, the wireless device 10 may perform intra-cell beam reselection, which can be done based on different criteria such as i) select the beams with strongest measurement results (e.g. RSRP, RSRQ, SINR, or equivalent) or according to any combining rules (e.g. strongest RSRP AND strongest RSRQ, etc.) within any other beam not in the list of non-allowed beams. If any selected beam, not in the list, is not suitable or have not been detected, the wireless device 10 should trigger cell re-selection or inter-cell beam reselection.

Upon being configured by the radio network node 12 with an indication of prioritized beams associated to that one or multiple cells, the wireless device 10 trying to access a cell that it is camping on, checks its list of the detected and/or suitable beams (i.e. accessible from a radio condition perspective) and compares with the list of prioritized beams. The wireless device 10 then selects the one with highest priority among the detected/suitable ones. Additional conditions may be fulfilled e.g. certain difference in radio conditions has precedent to the prioritization recommended by the radio network node 12.

Upon being configured by the radio network node 12 with an indication of redirected beams associated to that one or multiple cells, the wireless device 10 trying to access a cell that it is camping on, checks its list of the detected and/or suitable beams (i.e. accessible from a radio condition perspective) and compares with the list of redirected beams. The wireless device 10 then accesses any of the ones that is being redirected, e.g., the one with strongest measurement results and/or combination of these.

Action 405. The radio network node 12 accepts or rejects the initial access, potentially with additional information back to the wireless device 10 on how to access the cell again.

Figure 5:
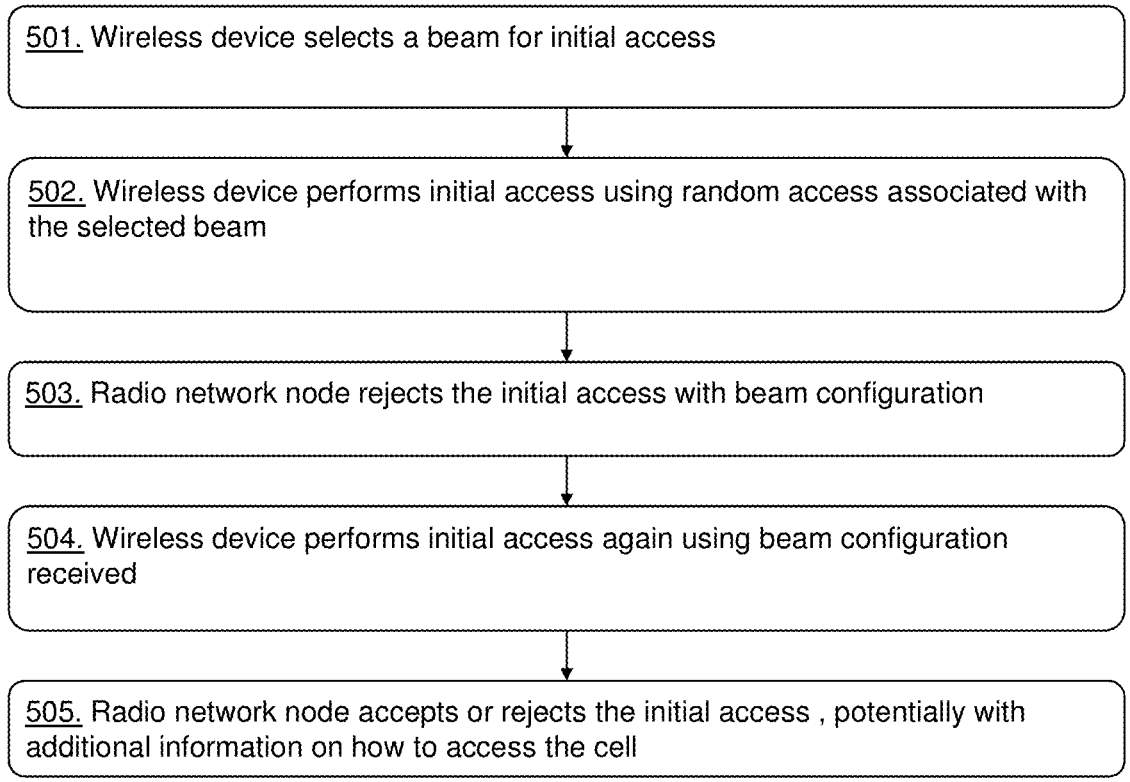
FIG. 5 is a schematic flowchart according to some embodiments herein.

The configuration information i.e. the beam configuration may, alternatively or additionally, be provided in a connection request, a connection resume request, an UL data packet with some control information, such as in small data transmission from INACTIVE, or any equivalent message that requires access to a contention based channel. That response can be, for example an RRC Connection Reject message that may contain beam information based on one or several alternatives on the information provided below with reference to FIG. 5.

Action 501. The wireless device 10 selects a beam for initial access.

Action 502. The wireless device 10 performs an initial access by performing random access associated with the selected beam.

Action 503. The radio network node 12 rejects the initial access and provides the wireless device 10 with the beam configuration for initial access.

For example, the radio network node 12 may indicate allowed beams associated to that cell or multiple cells to inform the wireless device 10 that the wireless device 10 shall only retry initial access performing RA associated to the indicated beams for the indicated cell or cells.

Additionally or alternatively, the radio network node 12 may indicate non-allowed beams associated to that cell or multiple cells to inform the wireless device 10 that the wireless device 10 shall not retry initial access using RACH associated to the indicated beams for the indicated cell or cells. The information indicates that the wireless device 10 may otherwise access any other beam in any of the indicated cells.

Additionally or alternatively, the radio network node 12 indicates prioritized beams associated to that cell or multiple cells to inform the wireless device 10 to prioritize RACH access associated to the indicated beams when retrying the initial access. The prioritized beams can be listed in order of priority or with some priority information included, for the indicated cell or cells.

Additionally or alternatively, the radio network node 12 may indicate redirected beams associated to that cell 11 or multiple cells to inform the wireless device 10 that the wireless device 10 to only retry initial RACH procedure associated to the indicated beams for the indicated cell or cells. These beams may be similar to allowed beams to certain extent, although the beams may be sent in another message and in different scenarios. The indication of a redirected beam may also be an explicit redirection of RACH resources where the radio network node 12 can inform the wireless device 10 to use specific time, frequency, and/or preamble resource in the sub-sequent RACH attempt.

Action 504. The wireless device 10 performs initial access again using the received beam configuration.

Upon being configured by the radio network node with an indication of allowed beams associated to that cell or multiple cells, the wireless device 10 may perform an intra-cell beam reselection, which can be done based on different criteria such as i) select the beams with strongest measurement results, e.g. RSRP, RSRQ, SINR, or equivalent, or according to any combining rules, e.g. strongest RSRP AND strongest RSRQ, etc., within the list of allowed beams. If none of the allowed beams in the cell is suitable or have not been detected, the wireless device 10 should trigger cell re-selection or inter-cell beam reselection.

Upon being configured by the network with an indication of non-allowed beams associated to that cell or multiple cells, the wireless device 10 should perform intra-cell beam reselection, which can be done based on different criteria such as i) select the beams with strongest measurement results, e.g. RSRP, RSRQ, SINR, or equivalent, or according to any combining rules, e.g. strongest RSRP AND strongest RSRQ, etc., within any other beam not in the list of non-allowed beams. If any selected beam not in the list is not suitable or have not been detected, the wireless device 10 may trigger cell re-selection or inter-cell beam reselection.

Upon being configured by the network with an indication of prioritized beams associated to that one or multiple cells, the wireless device 10 should perform intra-cell beam reselection and checks its list of the detected and/or suitable beams, i.e. accessible from a radio condition perspective, and compares with the list of prioritized beams. The wireless device 10 then selects the one with highest priority among the detected or suitable ones. Additional conditions could be fulfilled e.g. certain difference in radio conditions may have precedent to the prioritization recommended by the radio network node 12.

Upon being configured by the network with an indication of redirected beams associated to that one or multiple cells, the wireless device 10 may perform an intra-cell beam reselection, which can be done based on different criteria such as i) select the beams with strongest measurement results, e.g. RSRP, RSRQ, SINR, or equivalent, or according to any combining rules, e.g. strongest RSRP AND strongest RSRQ, etc., within the list of allowed beams. If none of the allowed beams in the cell is suitable or have not been detected, the wireless device 10 may trigger cell re-selection or inter-cell beam reselection.

Action 505. The radio network node 12 accepts or rejects the initial access, potentially with additional information on how to access the cell again.

After RACH the radio network node 12 may re-configure the wireless device 10 to perform beam reporting and, afterwards, the wireless device 10 may switch the beam or beam link pair(s) toward beam(s) that are less loaded than the ones that were accessed.

The radio network node 12 may determine or configure the beam configuration indicating preferred beams such as CSI-RS to select and/or conditions to be fulfilled such as strength or quality thresholds, based on e.g. load in different beams.

The beam configuration may comprise beam indicators and is for controlling or informing which beam or beams of the cell to select by the wireless device 10. Thus the wireless device 10 receives the beam configuration indicating preferred or in some embodiments not preferred beams. The beam configuration may comprise a threshold value of strength or quality, a list of not wanted beams, or a list of preferred beams. The indication may be a list of beams which are not suitable for access, or a radio link quality threshold for a beam to be selected by the wireless device.

It should be noted that in a general scenario the term "radio network node" can be substituted with "transmission and reception point". The key observation is that it must be possible to make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

Figure 6:
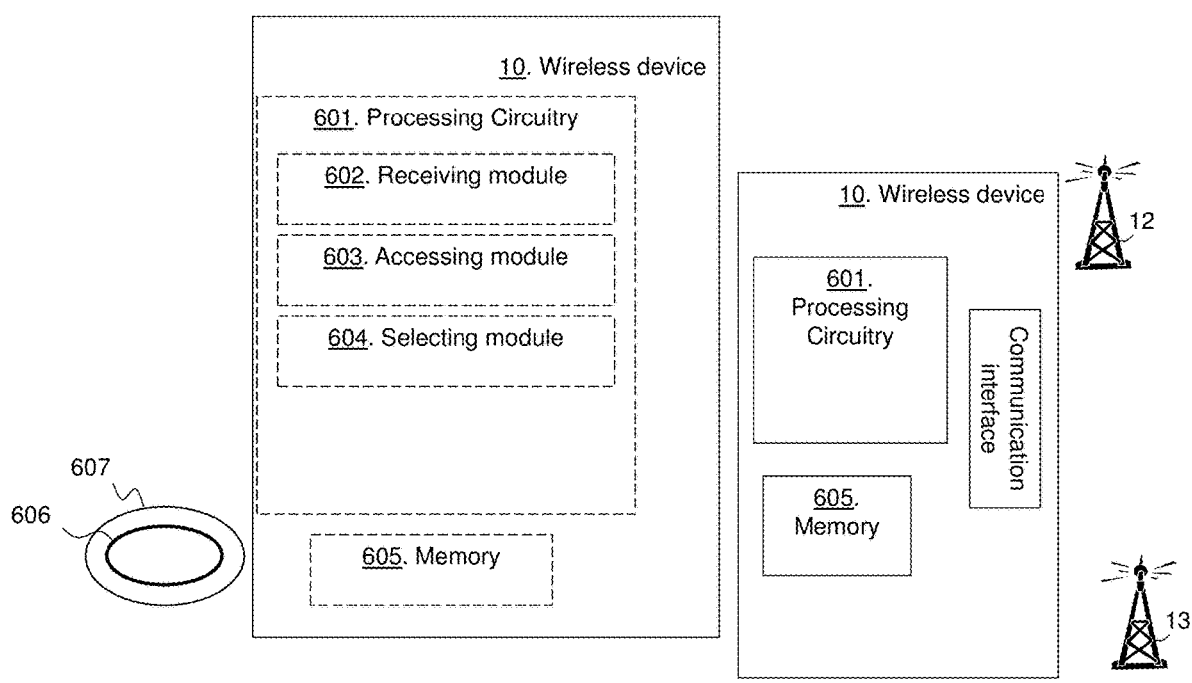
FIG. 6 is a block diagram depicting a wireless device according to embodiments herein.

FIG. 6 is a block diagram depicting the wireless device 10 according to embodiments herein for handling communication of the wireless device 10 in the wireless communication network 1. The radio network node 12 is configured to provide radio coverage over the cell, e.g. to serve the wireless device 10, and the wireless communication network 1 may further comprise the second radio network node 13.

The wireless device 10 may comprise processing circuitry 601, e.g. one or more processors, configured to perform the methods herein.

The wireless device 10 may comprise a receiving module 602, e.g. a receiver or transceiver. The wireless device 10, the processing circuitry 601, and/or the receiving module 602 is configured to receive from the radio network node 12, when the wireless device 10 is in a first state, the beam configuration indicating which beam or beams of the cell the wireless device 10 is allowed to select during a state transition or initial access. For example, the wireless device 10, the processing circuitry 601, and/or the receiving module 602 may be configured to receive, in the first state e.g. inactive state in the cell or entering the cell, the beam configuration controlling or indicating which beam of the cell the wireless device will select during a state transition or initial access. The beam configuration may comprise a threshold value of strength or quality, a list of not wanted beams, or a list of preferred beams, a list of allowed beams, or a list of non-allowed beams and thereby may the beam configuration indicates which beam or beams of the cell the wireless device is allowed to select during the state transition or the initial access.

The wireless device 10, the processing circuitry 601, and/or the receiving module 602 may be configured to receive from the radio network node 12, the rejection indication rejecting the initial access with additional information on how to access the cell again. The beam configuration may be provided: as configuration information in system information; during rejection of the initial access; or as a response to a random access request.

The wireless device 10 may comprise an accessing module 603, e.g. a transmitter or transceiver. The wireless device 10, the processing circuitry 601, and/or the accessing module 603 is configured to perform an initial access to the cell or a state transition taking the beam configuration into account.

The wireless device 10 may comprise a selecting module 604. The wireless device 10, the processing circuitry 601, and/or the selecting module 604 may be configured to select a beam for initial access; this may be based on the beam configuration. The wireless device 10, the processing circuitry 601, and/or the selecting module 604 may be configured to perform the initial access to the cell or the state transition by selecting or reselecting a beam based on the received beam configuration.

The wireless device 10 further comprises a memory 605. The memory comprises one or more units to be used to store data on, such as strengths qualities, indications, beams, CSI-RSs, thresholds, applications to perform the methods disclosed herein when being executed, and similar. The wireless device 10 may comprise a communication interface comprising transmitter, receiver, transceiver and/or one or more antennas.

The methods according to the embodiments described herein for the wireless device 10 are respectively implemented by means of e.g. a computer program product 606 or a computer program, comprising instructions, i.e., software code portions, which, when executed on at least one processor, cause the at least one processor to carry out the actions described herein, as performed by the wireless device 10. The computer program 606 may be stored on a computer-readable storage medium 607, e.g. a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

Thus, the wireless device may comprise the processing circuitry and the memory, said memory comprising instructions executable by said processing circuitry whereby said wireless device 10 is operative to perform the methods herein.

Figure 7:
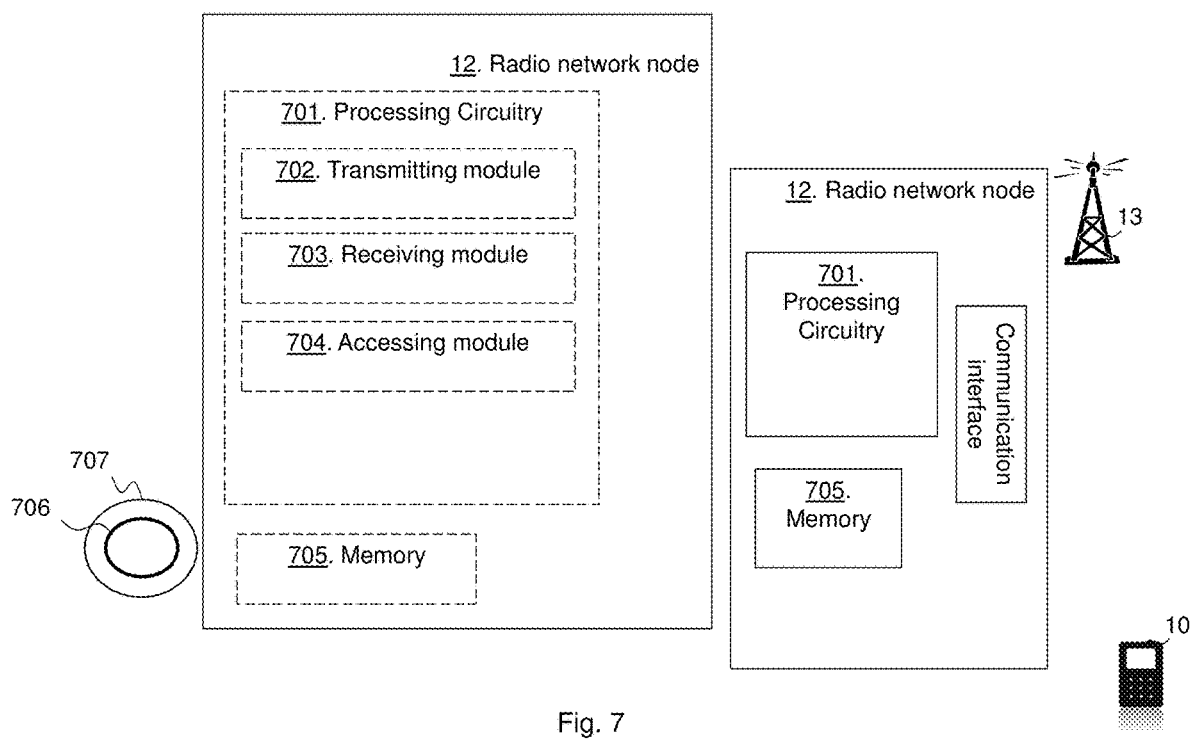
FIG. 7 is a block diagram depicting a radio network node according to embodiments herein.

FIG. 7 is a block diagram depicting the radio network node 12, such as a gNB, eNB or similar, according to embodiments herein for handling communication of the wireless device 10 in the wireless communication network. The radio network node 12 is configured to provide radio coverage over the cell 11 in the wireless communication network 1 e.g. the radio network node 12 is configured to serve the cell 11 or the wireless device 10 in the cell 11.

The radio network node 12 may comprise processing circuitry 701, e.g. one or more processors, configured to perform the methods herein.

The radio network node 12 may comprise a transmitting module 702, a transmitter or a transceiver. The radio network node 12, the processing circuitry 701, and/or the transmitting module 702 is configured to transmit to the wireless device 10, when the wireless device 10 is in the first state, the beam configuration indicating which beam or beams the wireless device 10 is allowed to select during the initial access or the state transition, i.e. transmit the beam configuration to the wireless device 10. The beam configuration may be provided as configuration information e.g. in system information, during rejection of the initial access, as a response to a random access request or similar. The beam configuration may comprise a threshold value of strength or quality, a list of not wanted beams, a list of preferred beams, a list of allowed beams, or a list of non-allowed beams and thereby may the beam configuration indicates which beam or beams of the cell the wireless device is allowed to select during the state transition or the initial access.

The radio network node 12 may comprise a receiving module 703, a receiver or a transceiver. The radio network node 12, the processing circuitry 701, and/or the receiving module 703 may be configured to receive random access request, initial access request or similar.

The radio network node 12 may comprise an accessing module 704. The radio network node 12, the processing circuitry 701, and/or the accessing module 704 may configured to reject the initial access by the wireless device based on a condition, i.e. reject or accept the initial access by the wireless device 10. The radio network node 12, the processing circuitry 701, and/or the accessing module 704 may configured to reject the initial access by providing the wireless device with additional information on how to access the cell again. The rejection may further comprise additional information on how to access the cell again e.g. using another beam and/or another RACH resource e.g. dedicated for that wireless device.

The radio network node 12 further comprises a memory 705. The memory comprises one or more units to be used to store data on, such as beam indications, strengths qualities, thresholds, beams, cells, applications to perform the methods disclosed herein when being executed, and similar. The radio network node 12 may comprise a communication interface comprising transmitter, receiver, transceiver and/or one or more antennas.

The methods according to the embodiments described herein for the radio network node 12 are respectively implemented by means of e.g. a computer program product 706 or a computer program, comprising instructions, i.e., software code portions, which, when executed on at least one processor, cause the at least one processor to carry out the actions described herein, as performed by the radio network node 12. The computer program 706 may be stored on a computer-readable storage medium 707, e.g. a disc, a USB stick, or similar. The computer-readable storage medium 707, having stored thereon the computer program may comprise the instructions which, when executed on at least one processor, cause the at least one processor to carry out the actions described herein, as performed by the radio network node 12. In some embodiments, the computer-readable storage medium may be a non-transitory computer-readable storage medium.

Thus, the radio network node 12 may comprise the processing circuitry and the memory, said memory comprising instructions executable by said processing circuitry whereby said radio network node 12 is operative to perform the methods herein.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

Figure 8A:
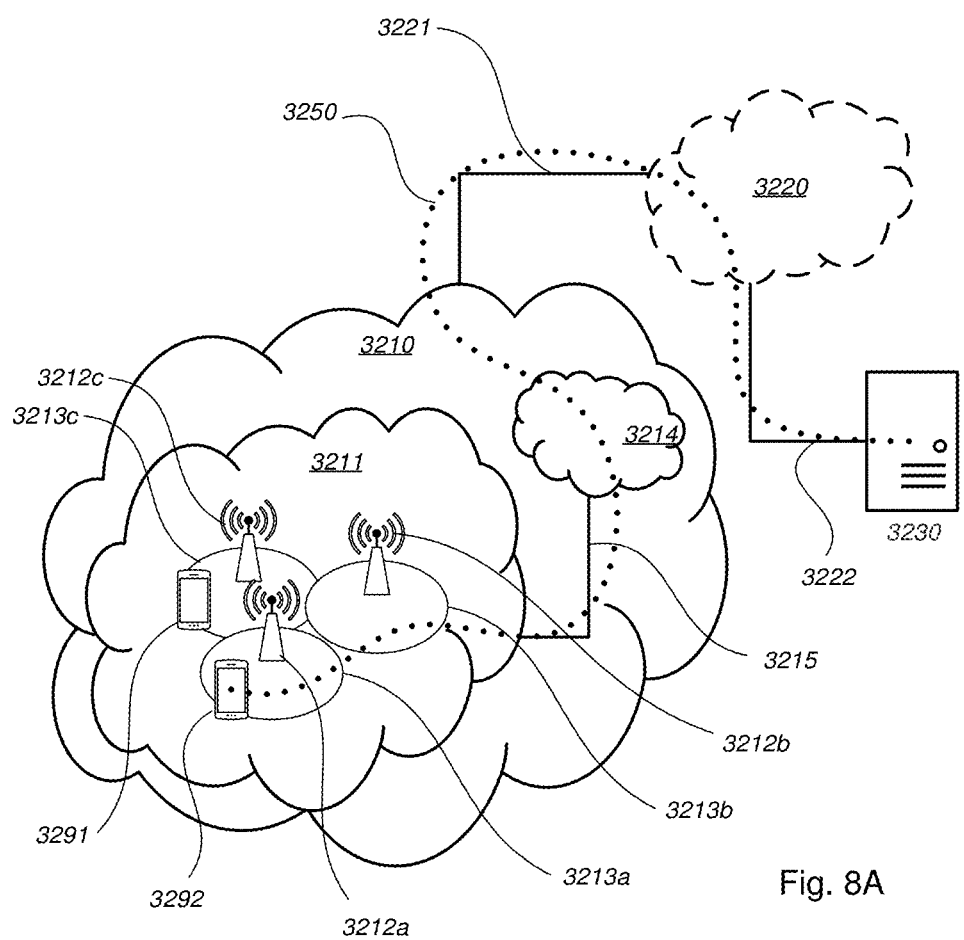
FIG. 8A schematically illustrates a telecommunication network connected via an intermediate network to a host computer.

With reference to FIG. 8A, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE)

3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8A as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8B. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 8B) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8B:
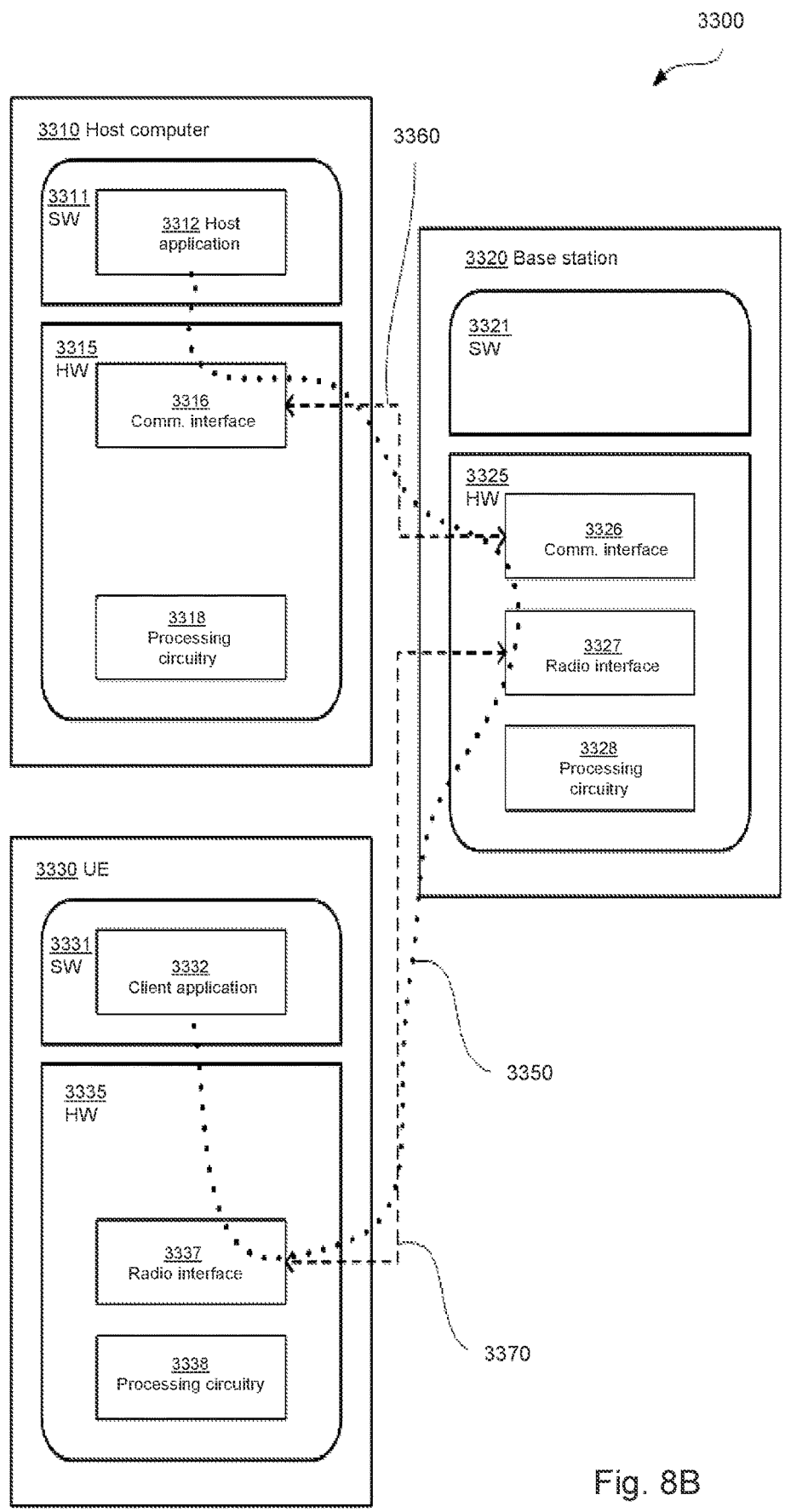
FIG. 8B is a generalized block diagram of a host computer communicating via a base station with a user equipment over a partially wireless connection.

It is noted that the host computer 3310, base station 3320 and UE 3330 illustrated in FIG. 8B may be identical to the host computer 3230, one of the base stations 3212a, 3212b, 3212c and one of the UEs 3291, 3292 of FIG. 8A, respectively. This is to say, the inner workings of these entities may be as shown in FIG. 8B and independently, the surrounding network topology may be that of FIG. 8A.

In FIG. 8B, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since beams are not as heavy loaded may be used, which may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
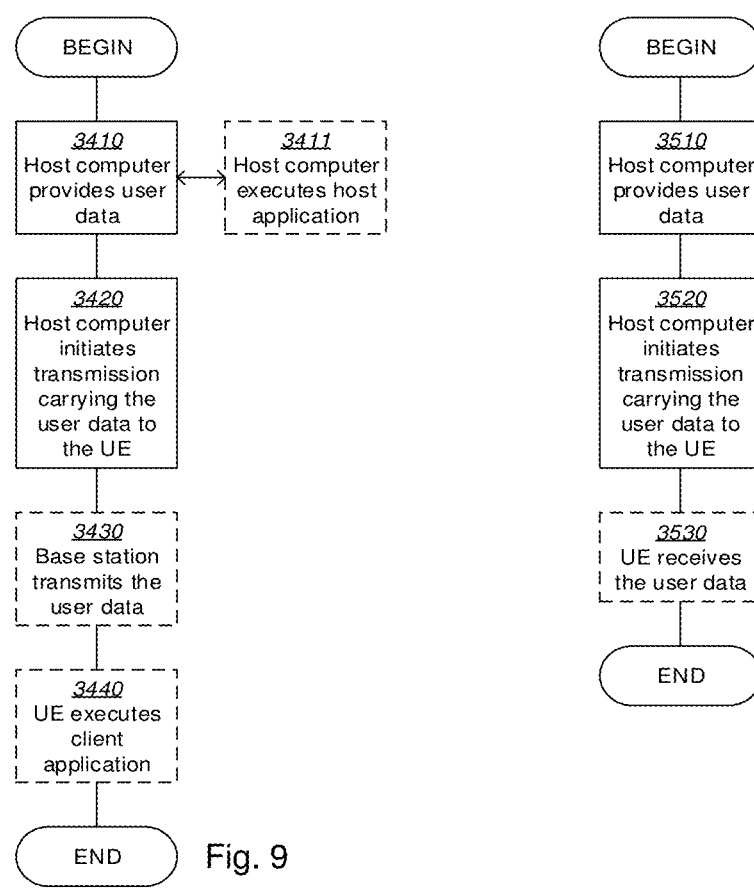

FIG. 9 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 8A and 8B. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a wireless communication network, wherein a radio network node in the wireless communication network provides radio coverage over a cell, the method comprising:

receiving from the radio network node, when the wireless device is in a first state, a beam configuration indicating which beam or beams of the cell the wireless device is allowed to select during a state transition with respect to the cell or initial access to the cell;

performing an initial access to the cell or a state transition from the first state to an active state with respect to the cell, taking the beam configuration into account; and receiving, from the radio network node, a rejection indication rejecting the initial access or the state transition, with additional information on how to access the cell again.

2. The method of claim 1, wherein the beam configuration comprises at least one of the following, whereby the beam configuration indicates which beam or beams of the cell the wireless device is allowed to select during the state transition or the initial access: a threshold value of strength or quality, a list of not wanted beams, a list of preferred beams, a list of allowed beams, and a list of non-allowed beams.

3. The method of claim 1, wherein performing the initial access to the cell or the state transition comprises selecting or reselecting a beam based on the received beam configuration.

4. The method of claim 1, wherein the beam configuration is received: during rejection of the initial access or as a response to a random access request.

5. A method performed by a radio network node for handling communication of a wireless device in a wireless communication network, wherein the radio network node provides radio coverage over a cell in the wireless communication network, the method comprising transmitting to the wireless device, when the wireless device is in a first state, a beam configuration indicating which beam or beams the wireless device is allowed to select during an initial access to the cell or a state transition from the first state to an active state with respect to the cell, wherein the beam configuration comprises at least one of the following, whereby the beam configuration indicates which beam or beams of the cell the wireless device is allowed to select during the state transition or the initial access: a threshold value of strength or quality, a list of not wanted beams, a list of preferred beams, a list of allowed beams, and a list of non-allowed beams.

6. The method of claim 5, further comprising
rejecting the initial access or the state transition by the wireless device based on a condition.

7. The method of claim 6, wherein rejecting the initial access or the state transition comprises providing the wireless device with additional information on how to access the cell again.

8. The method of claim 5, wherein the beam configuration is provided: during rejection of the initial access, or as a response to a random access request.

9. A wireless device for handling communication of the wireless device in a wireless communication network, wherein a radio network node in the wireless communication network is configured to provide radio coverage over a cell, wherein the wireless device comprises processing circuitry for handling communication in a wireless communication network, and wherein the processing circuitry is configured to:

receive from the radio network node, when the wireless device is in a first state, a beam configuration indicating which beam or beams of the cell the wireless device is allowed to select during a state transition with respect to the cell or initial access to the cell; and perform an initial access to the cell or a state transition to an active state with respect to the cell, taking the beam configuration into account; and receive, from the radio network node, a rejection indication rejecting the initial access or the state transition, with additional information on how to access the cell again.

10. The wireless device of claim 9, wherein the beam configuration comprises at least one of the following, whereby the beam configuration indicates which beam or beams of the cell the wireless device is allowed to select during the state transition or the initial access: a threshold value of strength or quality, a list of not wanted beams, a list of preferred beams, a list of allowed beams, and a list of non-allowed beams and thereby the beam configuration indicates which beam or beams of the cell the wireless device is allowed to select during the state transition or the initial access.

11. The wireless device of claim 9, wherein the wireless device is configured to perform the initial access to the cell or the state transition by selecting or reselecting a beam based on the received beam configuration.

12. The wireless device of claim 9, wherein the beam configuration is received: during rejection of the initial access, or as a response to a random access request.

13. A radio network node for handling communication of a wireless device in a wireless communication network, wherein the radio network node is configured to provide radio coverage over a cell in the wireless communication network, wherein the radio network node comprises processing circuitry, and wherein the processing circuit is configured to:

transmit to the wireless device, when the wireless device is in a first state, a beam configuration indicating which beam or beams the wireless device is allowed to select during an initial access to the cell or a state transition from the first state to an active state with respect to the cell, wherein the beam configuration comprises at least one of the following, whereby the beam configuration indicates which beam or beams of the cell the wireless device is allowed to select during the state transition or the initial access: a threshold value of strength or quality, a list of not wanted beams, a list of preferred beams, a list of allowed beams, and a list of non-allowed beams.

14. The radio network node of claim 13, wherein the radio network node is further configured to reject the initial access or the state transition by the wireless device, based on a condition.

15. The radio network node of claim 14, wherein the radio network node is configured to reject the initial access or the state transition by providing the wireless device with additional information on how to access the cell again.

16. The radio network node of claim 13, wherein the beam configuration is provided: during rejection of the initial access, or as a response to a random access request.

* * * * *